(12) United States Patent
Khu

(10) Patent No.: US 11,824,332 B2
(45) Date of Patent: Nov. 21, 2023

(54) DEVICE AND METHOD FOR STRIPPING CABLES

(71) Applicant: Komax Holding AG, Dierikon (CH)

(72) Inventor: Peter Khu, Vienna (AT)

(73) Assignee: KOMAX HOLDING AG, Dierikon (CH)

( * ) Notice: Subject to any disclaimer, the term of this patent is extended or adjusted under 35 U.S.C. 154(b) by 0 days.

(21) Appl. No.: 17/254,336

(22) PCT Filed: Jun. 14, 2019

(86) PCT No.: PCT/EP2019/065699
§ 371 (c)(1),
(2) Date: Dec. 21, 2020

(87) PCT Pub. No.: WO2019/243193
PCT Pub. Date: Dec. 26, 2019

(65) Prior Publication Data
US 2021/0273426 A1  Sep. 2, 2021

(30) Foreign Application Priority Data
Jun. 20, 2018  (AT) .............................. A 50495/2018

(51) Int. Cl.
*H02G 1/12*  (2006.01)

(52) U.S. Cl.
CPC ......... *H02G 1/1265* (2013.01); *H02G 1/1278* (2013.01)

(58) Field of Classification Search
CPC .............. Y10T 83/0467; H02G 1/1265; H02G 1/1278; H02G 1/127; H02G 1/1248; H02G 1/12; H02G 1/1202; H02G 1/1251; H02G 1/1253; H02G 1/1256
USPC ................................ 81/9.4, 9.51, 9.41, 9.42
See application file for complete search history.

(56) References Cited

U.S. PATENT DOCUMENTS

| | | | |
|---|---|---|---|
| 2,346,314 A | 4/1944 | Lembitz et al. | |
| 2,659,140 A * | 11/1953 | Davison | H02G 1/1229 30/91.2 |
| 3,636,799 A | 1/1972 | Anderson et al. | |
| 4,987,801 A | 1/1991 | Brown | |

(Continued)

FOREIGN PATENT DOCUMENTS

| | | |
|---|---|---|
| CN | 2239653 Y | 11/1996 |
| CN | 2914266 Y | 6/2007 |
| CN | 105406410 A | 3/2016 |

(Continued)

OTHER PUBLICATIONS

International Search Report and Written Opinion of the International Searching Authority with Translation; Application No. PCT/EP2019/065699; Completed: Jul. 19, 2019; dated Jul. 29, 2019; 10 Pages.

*Primary Examiner* — Phong H Nguyen
(74) *Attorney, Agent, or Firm* — Husch Blackwell LLP

(57) ABSTRACT

A device and method for stripping a cable has at least one support roller arrangement and a work wheel arrangement. The end of the cable to be stripped can be clamped with the application of a pressure force between the work wheel arrangement and the support roller arrangement. The unit made up of the work wheel arrangement and the support roller arrangement can be driven to rotate around the cable and to roll off thereon.

21 Claims, 3 Drawing Sheets

(56) References Cited

U.S. PATENT DOCUMENTS 5,361,653 A     11/1994  Pradin
2014/0318323 A1* 10/2014  Zhang .................. H02G 1/1221
                                               81/9.51

FOREIGN PATENT DOCUMENTS

| CN | 105846364  | A | 8/2016  |
|----|------------|---|---------|
| DE |   1073050  | B | 11/1958 |
| DE |  01073050  | B | 1/1960  |
| EP |   1428422  | A1| 6/2004  |
| EP |   2693581  | A1| 2/2014  |
| JP |   49-10385 | A | 1/1974  |
| JP | H02133017  | A | 5/1990  |
| JP | H04222410  | A | 8/1992  |
| JP | H05184031  | A | 7/1993  |
| JP | H05219621  | A | 8/1993  |
| JP | H06013319  | U | 2/1994  |
| JP | H09311259  | A | 12/1997 |

* cited by examiner

DEVICE AND METHOD FOR STRIPPING CABLES

TECHNICAL FIELD

The present teaching relates to a device and a method for stripping a cable.

BACKGROUND

Shielded cables substantially consist of a shielded line arrangement that has one or more conductors, at least one shielding layer, and a protective sheath. The shielding layer and the protective sheath are arranged concentrically around the line arrangement, the shielding layer shielding the inner conductor from electrical or magnetic fields, and the protective sheath arranged around the shielding layer in particular offering mechanical protection against external influences.

To connect shielded cables, it is necessary to sever the protective sheath around the cable at a specific distance from the cable end and then pull it off the shielding layer. However, the shielding layer must remain intact, since otherwise correct shielding in the region of the connection point cannot be ensured.

The shielding layer generally consists of an extremely thin and sensitive material, for example a thin aluminum foil, a plastics material foil, a filigree wire mesh, or a plurality of such layers. The protective sheath, on the other hand, must be made of a resistant material, for example of resistant plastics material such as PUR, PVC, silicone, etc.

The stripping of shielded cables is therefore mostly done by hand and requires dexterity and experience. Known mechanical aids, such as wire strippers or rotary cutters, also require very careful and experienced handling, since they can also easily destroy the shielding.

The installation of numerous shielded cable connections, as required in the industrial production of electric cars, can therefore be a time-consuming undertaking.

EP 2 693 581 A1 discloses a device for stripping shielded cables having a blade arrangement which can be rotated around the cable and the infeed of which can be changed for making a cut in the protective sheath. An electronic detection device determines when the blades come into contact with the shield, but it is usually too late when the detection device strikes because the shield or the conductor has already been cut or damaged.

It is one object of the present teaching to provide devices and methods with which the stripping of cables, in particular shielded cables, can be carried out quickly, easily, and safely even by inexperienced users, or can be used as a component with high process reliability in automated cable assembly.

SUMMARY

This object is achieved according to the present teaching by a device of the type mentioned at the outset, the device having at least one support roller arrangement and one work wheel arrangement, wherein the end of the cable to be stripped can be clamped with the application of a pressure force between the work wheel arrangement and the support roller arrangement, and wherein the unit made up of the work wheel arrangement and the support roller arrangement can be driven to rotate around the cable and to roll off thereon.

The support roller arrangement can advantageously be arranged on a rotation base, wherein the work wheel arrangement is arranged on a work wheel guide, and wherein the rotation base and the work wheel guide are connected to one another via at least one linear guide and are displaceable relative to one another along a guide direction running transversely to the axis of rotation. As a result, the pressure force can be generated in a simple manner, with springs or corresponding actuating devices being able to generate and regulate the pressing force if necessary.

In an advantageous manner, the length and/or position of the linear guide are adjustable, for example, by means of limiting elements and/or adjusting screws. This allows the device to be easily adapted to different cable thicknesses.

In an advantageous embodiment, the work wheel guide can have an eccentric weight distribution with respect to the axis of rotation, wherein a centrifugal force causing the pressure force acts on the work wheel guide, when the rotation base, with the work wheel guide arranged thereon via the linear guides, rotates around the axis of rotation. No tension springs or adjusting devices are required to generate the pressure force.

The work wheel arrangement can advantageously have at least one rolling wheel. The use of a rolling wheel has the advantage that the rolling wheel rolling off on the sheath along a cutting region wears down the material of the sheath until finally the sheath can no longer withstand the pressure of the rolling wheel and it severs through the sheath. In contrast, the rolling wheel cannot penetrate the harder and more solid shielding layer and it therefore remains undamaged.

In a further advantageous embodiment, the work wheel arrangement can have at least two rolling wheels which may have a different edge geometry. This accelerates the breaking down of the sheath material. Due to different edge geometries, the sheath material can be deformed in different ways in the manner of a "kneading movement," which also accelerates the wear-down process. The individual rolling wheels can either substantially roll off one behind the other along the same line, or they can be arranged laterally offset from one another in the cutting region. The outer edges of the individual rolling wheels may also have a slightly different distance from the axis of rotation.

In a further advantageous embodiment of the present teaching, at least one element of the work wheel arrangement can be designed as a wobble wheel. This can be done, for example, by an axis that is slightly inclined with respect to the normal to the wheel plane, or by an undulating course of the outer edge with respect to the wheel plane, for example in the form of a so-called "figure eight." As a result, the sheath material is pressed back and forth a plurality of times with each "circling" of the rolling wheel, which accelerates material fatigue and wear down.

Advantageously, the work wheel arrangement can have at least one rolling wheel and at least one cutting wheel which roll off along a cutting region on the circumference of the cable, wherein the rolling wheel has a blunter edge geometry than the cutting wheel. The blunter rolling wheel can thereby artificially fatigue and wear down the material of the protective sheath of the cable by rolling, but a penetration of the cutting wheel into the shielding layer to be protected and/or line arrangement is prevented when the rolling wheel rolls off thereon.

In a further advantageous embodiment, the radially outer edge of the rolling wheel can be arranged closer to the axis of rotation than the radially outer edge of the cutting wheel. This reliably prevents damage to the shielding layer and/or the line arrangement.

The rolling wheel can advantageously have a larger radius than the cutting wheel. The difference in the infeed of the rolling wheel and cutting wheel can thus be produced in a simple manner, the rotational axes of the rolling wheel and cutting wheel being arranged at the same distance from the axis of rotation.

In a further advantageous embodiment, at least one rolling wheel can be heated.

Advantageously, an electrical voltage can be applied to at least one element of the work wheel arrangement, in particular to a rolling wheel and/or cutting wheel and/or an electrode. This electrical voltage can generate sparks that weaken the material of the protective sheath and/or a boundary layer in a targeted manner and allow for clean separation. In particular, spark erosion can be used to weaken or perforate an electrically conductive boundary layer, which is provided between the shielding layer and the protective sheath in some cable types by means of spark erosion during one revolution of the work wheel arrangement, so that this boundary layer is prevented from "fraying" when the protective sheath is removed. The sparks arise between the rolling wheel, or the cutting wheel, or the electrode, to which the electrical voltage is applied, and the metal coating of the boundary layer and/or the shielding layer. The voltage is preferably only applied when the work wheel arrangement has already sufficiently approached the shielding layer. By adapting the duration of the application of the spark erosion to one revolution, it is possible to avoid impairment of the shielding layer, for example damage to a shielding braid or a conductive film that may be present.

In the above-mentioned method for stripping a cable, according to the present teaching, the end of the cable to be stripped is clamped between a work wheel arrangement and a support roller arrangement while applying a pressure force, and the unit of work wheel arrangement and support roller arrangement is driven to rotate around the cable and to roll off thereon.

The support roller arrangement can advantageously be arranged on a rotation base, wherein the work wheel arrangement is arranged on a work wheel guide, and wherein the rotation base and the work wheel guide are connected to one another via at least one linear guide and are displaceable relative to one another along a guide direction running transversely to the axis of rotation.

In an advantageous embodiment, the work wheel guide can have an eccentric weight distribution with respect to the axis of rotation, wherein a centrifugal force causing the pressure force acts on the work wheel guide, when the rotation base, with the work wheel guide arranged thereon via the linear guides, rotates around the axis of rotation.

In an advantageous manner, at least one rolling wheel of the work wheel arrangement can roll off along a cutting region on the circumference of the cable, whereby the sheath material is worn down.

In a further advantageous embodiment, at least two rolling wheels of the work wheel arrangement, which may have a different edge geometry, can roll off along a cutting region on the circumference of the cable.

Advantageously, at least one element of the work wheel arrangement can roll off along a cutting region on the circumference of the cable in a wobbling manner.

The method can advantageously be carried out with a work wheel arrangement which has at least one rolling wheel and at least one cutting wheel which roll off along a cutting region on the circumference of the cable, wherein the rolling wheel has a blunter edge geometry than the cutting wheel.

In a further advantageous embodiment, the radially outer edge of the rolling wheel can be arranged closer to the axis of rotation than the radially outer edge of the cutting wheel. Instead of the cutting wheel, a fixed cutting edge could also be used in this case, since the cutting blade coming into contact with the shielding layer can be excluded.

Preferably, a rolling wheel can be used which has a larger radius than the cutting wheel.

In a further advantageous embodiment, the rolling wheel can be heated.

According to the present teaching, the rotation base can advantageously be driven at a maximum speed between 3000 rpm and 5000 rpm, preferably between 3500 rpm and 4500 rpm, so that a stripping process can be carried out very quickly.

Advantageously, an electrical voltage can be applied to at least one element of the work wheel arrangement, in particular a rolling wheel and/or a cutting wheel and/or an electrode, to weaken or perforate the material of at least part of the protective sheath by spark erosion. The application of the voltage can be coordinated in an advantageous manner with the regulation of the drive of the rotation base, with the advance of the work wheel arrangement and/or with the radial position of the rotation base or its revolution.

BRIEF DESCRIPTION OF THE DRAWINGS

The present teaching is described in greater detail in the following with reference to FIGS. 1 to 7, which show advantageous embodiments of the present teaching by way of example, schematically and in a non-limiting manner. In the figures.

DETAILED DESCRIPTION

Figure 2:
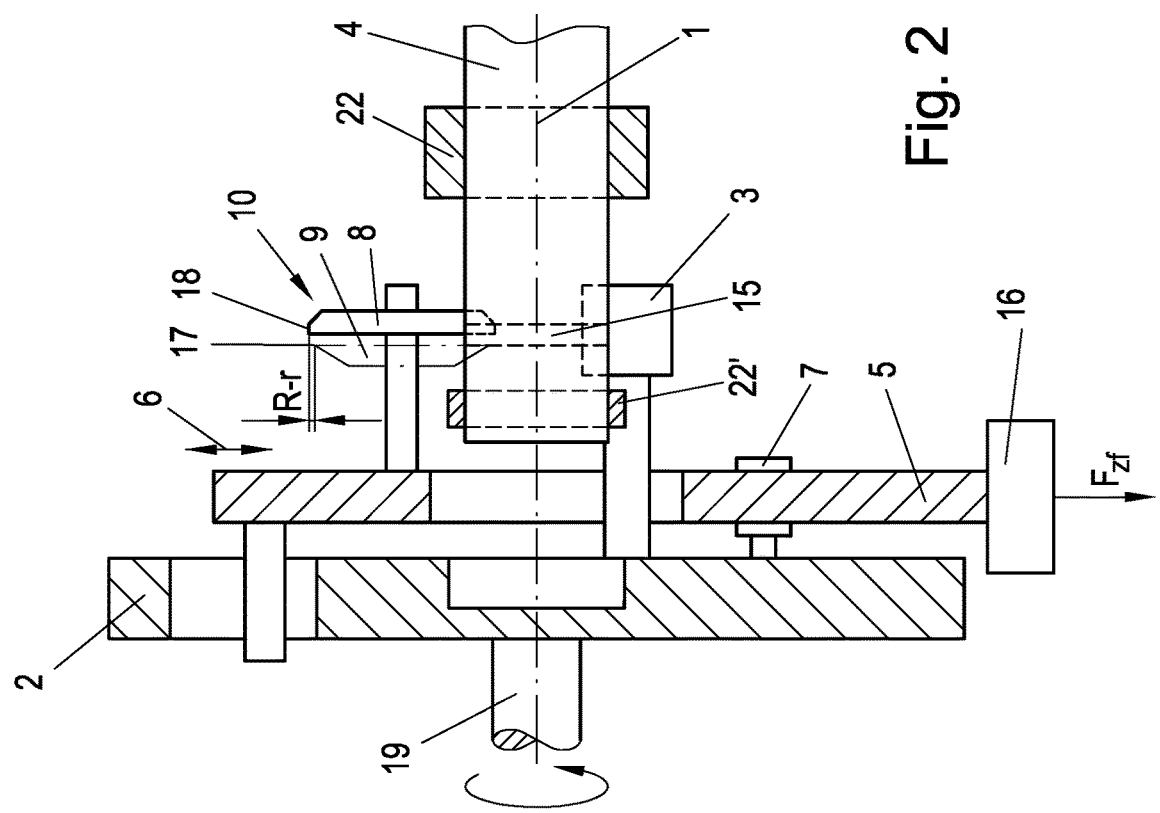
FIG. 2 is a sectional view of the device shown in FIG. 1 along the line II-II in FIG. 1.
Figure 1:
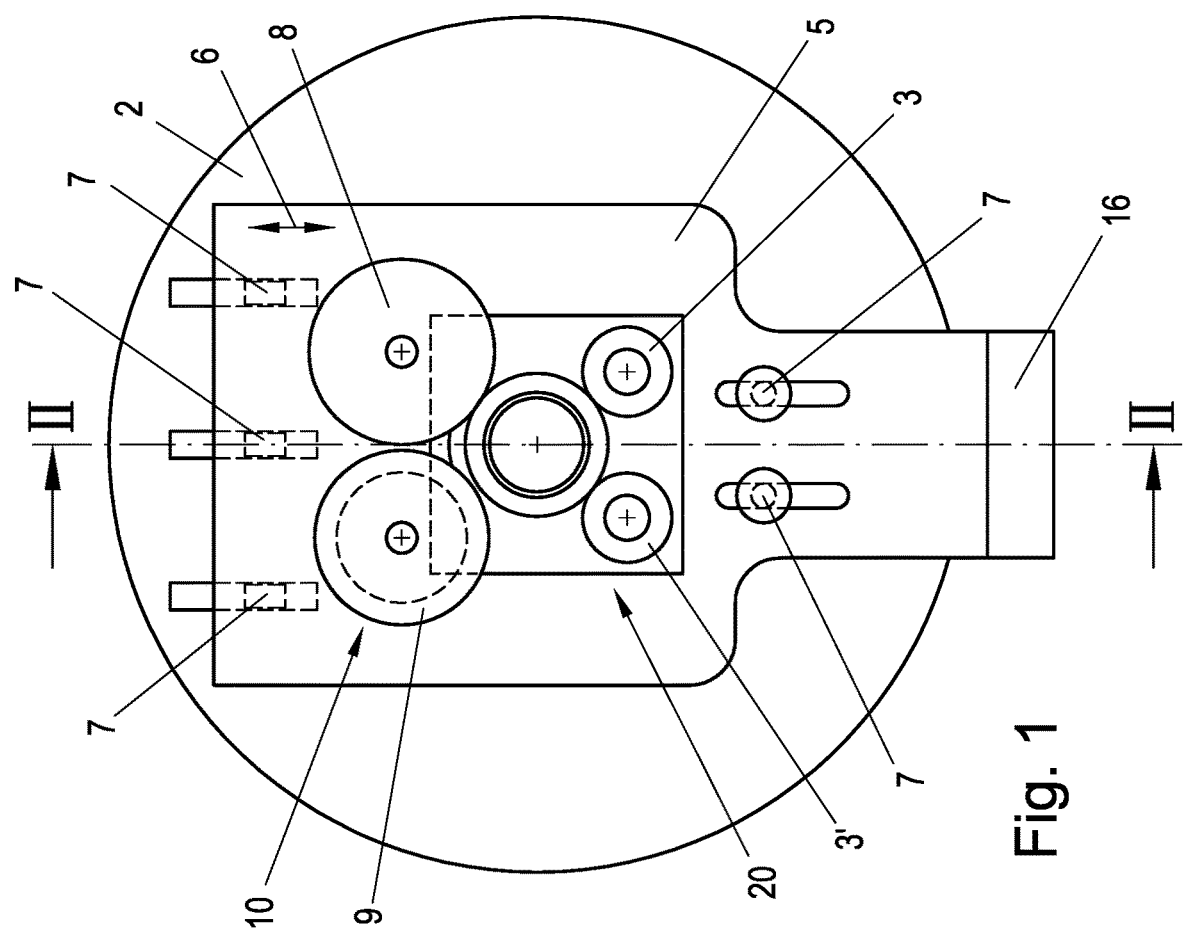
FIG. 1 is a schematic top view of one embodiment of the device according to the present teaching for stripping cables.

The device for stripping a cable 14 shown by way of example in FIGS. 1 and 2 has a plate-shaped rotation base 2 rotatable about an axis of rotation 1, on the front of which a support roller arrangement 20 consisting of a pair of support rollers 3, 3' is arranged. The rotation base 2 can be connected, for example, via a shaft 19 to a motor (not shown) which drives the rotation base 2. The rotational axes of the support rollers 3, 3' are arranged parallel to the axis of rotation 1 and are at a distance from the axis of rotation 1, said distance being selected in relation to the diameter of a cable 4 to be stripped so that the cable 4 arranged on the support rollers 3, 3' is aligned to be centered with the axis of rotation 1. The position of the support rollers may be adjusted in order to be able to adjust the device to cables of different thicknesses. During the stripping, however, the position of the support rollers 3, 3' remain unchanged in relation to the rotating rotation base 2, the support rollers moving around the cable 4 and rolling off on the outer surface thereof.

A plate-shaped work wheel guide 5 is arranged on the rotation base 2 and is displaceable in a guide direction 6 running transversely to the axis of rotation 1 (i.e., parallel to the plane of the plate). The work wheel guide 5 can for example be connected to the rotation base 2 via one or more linear guides 7, the linear guides 7 shown in FIGS. 1 and 2 being designed as slot guides in which sliding bodies are arranged displaceably in guide slots. However, linear guides 7 of any design can be used. The length of the linear guides 7 may be adjusted and/or limited, for example via adjustable limiting elements (such as adjusting screws). Usable linear guides 7 and corresponding limiting elements are sufficiently known to the person skilled in the art and therefore do not have to be described in more detail in this case. When designing the linear guides 7, sufficient precision of movement must be ensured.

The rotation base 2 can optionally be provided with a central recess 21 into which the end of the cable can protrude so that the space required by the rotating parts can be minimized. The recess 21 is only indicated schematically in FIG. 1, but it can also be made significantly deeper.

A work wheel arrangement 10 consisting of a rolling wheel 8 and a cutting wheel 9 is arranged on the work wheel guide 5. The rolling wheel 8 and the cutting wheel 9 each have an axis of rotation arranged parallel to the axis of rotation 1. In relation to the axis of rotation 1 (and the position of the cable 4 defined therein), the work wheel arrangement 10 is arranged in the guide direction 6 on the side opposite the support rollers 3, 3', so that the cable 4 resting on the support rollers 3, 3' can be clamped in the guide direction 6 between the support rollers 3, 3' and the work wheel arrangement 10 by displacing the work wheel arrangement 10. When the rotation base 2 now rotates about the axis of rotation 1, the support rollers 3, 3', the rolling wheel 8, and the cutting wheel 9 roll off on the circumference of the cable 4, i.e. on its protective sheath 14, along a cutting region 15.

It should be noted that the cutting region 15 is not a cutting line, but rather identifies a region in which the protective sheath 14 of the cable is to be severed. As will be explained in the following, the action of the rolling wheel 8 also extends laterally beyond the region of direct contact between the rolling wheel 8 and protective sheath 14, so that the rolling wheel 8 and the cutting wheel 8 can also be arranged slightly offset to one another laterally. The region that is affected by the action of the rolling wheel 8 is referred to as the cutting region 15 in connection with the present teaching.

The cable 14 can be secured in a fixed (i.e., not rotating with the rotating parts) clamping device 22, which is only indicated schematically in FIG. 2. The clamping device 22 can be arranged very close to the work wheel guide, in order to press the cable in its round cross-sectional shape and to hold it therein during processing. This is particularly advantageous with softer cables. The free end of the cable 4 may also be held with a corresponding inner clamping device 22' (this is also indicated schematically in FIG. 2), wherein the inner clamping device 22' can be mounted on the rotation base 2, for example by means of a ball bearing (not shown). Thus, the inner clamping device can stand still during the rotation of the moving parts and center the cable. The inner clamping device 22' can then also be used, for example, to pull the separated part of the protective sheath 44 off the cable 4 after processing.

At the end of the work wheel guide 5 opposite the work wheel arrangement 10 in relation to the axis of rotation 1 in the guide direction 6, a weight 16 is provided which gives the work wheel guide 5 an eccentric weight distribution. The eccentric weight distribution can also be ensured without additional weight 16 solely by the shape of the work wheel guide.

When the rotation base 2, with the work wheel guide 5 arranged thereon via the linear guides 7, rotates around the axis of rotation 1, a centrifugal force $F_{zf}$ acts on the weight 16 (or on the eccentric center of gravity of the work wheel guide 5), so that the working wheel arrangement 10 is pressed against the outer surface of the cable 4 (or against the counterforce applied by the support rollers 3, 3'). The pressure force of the working arrangement 10 against the cable can thus be controlled structurally via the design of the weight 16 and procedurally via the rotational speed. The weight 16 may be designed to be exchangeable or changeable in order to vary the pressure force. The work wheel guide 5 can optionally be preloaded into the "open" position by means of tensioning means such as springs, the work wheel arrangement 10 then only coming into contact with the protective sheath 14 of the cable 4, when the device rotates sufficiently quickly and the work wheel guide 5 is pressed sufficiently strongly against the spring force by the centrifugal force. As an alternative or in addition to this, the drive of the rotating parts can be regulated in such a way that the weight 16 is arranged at the top at a standstill, so that the work wheel arrangement is automatically pushed down (i.e., into the open position) by its own weight.

In connection with the present disclosure, the "front side" is the side of the device on which the cable 4 to be stripped is to be arranged, i.e., the side shown in FIG. 1. The term is only used for understanding and orientation and is not to be interpreted restrictively. In particular, it would also be possible to "reverse" the arrangement of rotation base 2 and work wheel guide 5 so that work wheel guide 5 with the elements arranged thereon is arranged "behind" the rotation base 2, the cable then being inserted through a central opening provided in rotation base 2 in order to come into contact with the work wheel arrangement and the support roller arrangement. The work wheel arrangement 10 may also be arranged between the rotation base 2 and the work wheel guide 5, or it can be arranged in a protected manner in an interior of the work wheel guide 5. Implementation of the design changes required for such alternative embodiments is within the ability of an ordinary person skilled in the art.

The cable 4 consists substantially of a conductor 11 or a plurality of conductors 11 which are arranged in a line arrangement 12 forming the core of the cable 4. The individual conductors 11 can be electrically insulated from one another or towards the outside, it being possible for further layers to be provided depending on the cable type, for example in order to separate individual conductor bundles from one another. A shielding layer 13 is provided around the line arrangement 12, for example a thin metal foil, for example made of aluminum or copper, or a filigree wire mesh. The shielding layer 13 may also consist of a plurality of such layers. Such shielding layers 13 are sufficiently known in the technical field in the most varied of embodiments and therefore do not have to be described in more detail in this case. Since the shielding layer 13 usually consists of a comparatively expensive material, the manufacturers endeavor to make this layer as thin as possible. The shielding layer 13 is therefore usually very sensitive. The protective sheath 14 is therefore arranged as the outermost layer around the shielding layer 13 and protects the unit made up of the line arrangement 12 and shielding layer 13 against external influences.

An additional, very thin boundary layer (not shown) can optionally be provided between the shielding layer 13 and the protective sheath 14, which can for example consist of a very thin metal-coated plastics material tape that is wound around the shielding layer 13.

The rolling wheel 8 and the cutting wheel 9 each have a different cross section in a plane parallel to their axis of rotation. In particular, the cutting wheel 9 forms a radially circumferential cutting edge 17, while the rolling wheel 8 has a blunter edge geometry than the cutting wheel 9, which is referred to as "rolling contour 18" in connection with the present disclosure. The rolling contour 18 of the rolling wheel 8 is designed for the material parameters of the protective sheaths 14 to be cut and in accordance with the adjusted or adjustable pressure forces, so that the rolling wheel 8 does not cut into the material of the protective sheath 14, but merely presses the material and displaces it a little.

In contrast to this, in connection with the present teaching, a "cutting blade" is viewed as a contour which, under these conditions, penetrates the material of the protective sheath 14 in a cutting manner.

The continuous load of the "rolling" of the protective sheath 14 carried out by the rolling wheel 8 impairs the quality of the material in the cutting region 15 and "wears down" the material, so that it can be easily severed by the cutting wheel 9. Since the shielding layer 13 is made of a different material (generally metal) than the protective sheath 14 (generally plastics material), the pressure of the rolling contour 18 on the shielding layer 13 only causes a smaller deformation than is the case with the material of the protective sheath 14. As soon as the rolling contour 18 thus comes into the region of the shielding layer 13, the rolling wheel 8 is pressed in less deeply, so that also the cutting wheel 9 that moves parallel with the rolling wheel 8 as part of the work wheel arrangement 10 does not come into contact with the shielding layer 13. The shielding layer 13 can therefore not be cut by the cutting wheel 8.

Figure 3:
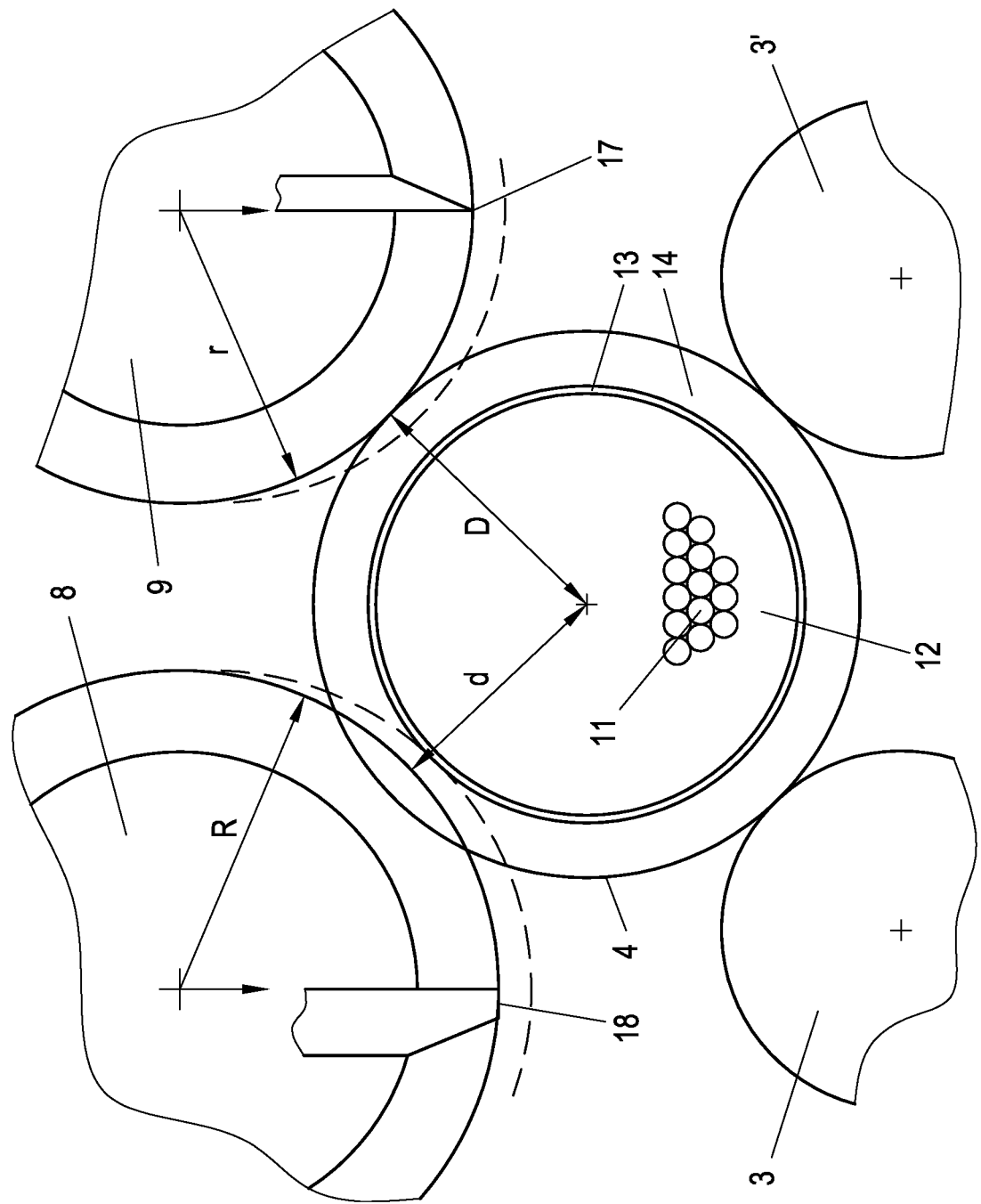
FIG. 3 is a schematic cross section of a cable, which is arranged for stripping in the device according to the present teaching and the work wheel arrangement and the support roller arrangement engaging the cable.

In order to improve this effect, the outer edge of the rolling contour 18 is arranged a little closer to the axis of rotation 1 than the outer edge of the cutting edge 17. The corresponding dimensions are also shown in FIG. 3. The difference between the (larger) distance D between the cutting edge 17 and the axis of rotation 1 and the (smaller) distance d between the rolling contour 18 and the axis of rotation 1 is very small and can be, for example, between 5% and 50%, preferably between 10 and 20%, of the layer thickness of the protective sheath 14 to be severed. For example, the difference can be between approximately 50 µm and 200 µm, in particular approximately 100 µm.

The difference (D-d) can be constructed in different ways. In an embodiment that is very easy to manufacture, for example, the rolling wheel 8 and the cutting wheel 9 can each have different outer radii, the outer radius R of the rolling wheel 8 being larger than the outer radius r of the cutting wheel 9. This makes it possible to arrange the rolling wheel 8 and the cutting wheel 9 at the same distance from the axis of rotation 1, which is structurally advantageous.

The radii, distances, and contours are shown schematically and clearly in FIG. 3. The cable 4, which is arranged coaxially on the axis of rotation 1, is held in position between the two support rollers 3, 3' and the work wheel arrangement 10 composed of rolling wheel 8 and cutting wheel 9, which presses against the support rollers 3, 3' due to the centrifugal force, while the rollers or wheels rotate around the cable. In the process, the rolling wheel 8 rolls and displaces the material of the protective sheath 14 and thus very quickly leads to targeted material fatigue so that the material can be cut by the "subsequent" cutting wheel 9 at this point. The rolling wheel 8 then penetrates this cut and displaces and wears down the material even more.

As soon as the rolling wheel 8 has reached the material of the shielding layer 13, further displacement and penetration into the material is prevented due to the higher strength of the shielding layer 13 and line arrangement 12, and the rolling wheel rolls off on the surface of the shielding layer 13 and prevents that the shielding gap 13 comes into contact with the cutting wheel 9. This position is shown in FIG. 3 by the dashed outline of the rolling wheel 8 and cutting wheel 9. The drive of the device can then be switched off, the cable removed, and the separated part of the protective sheath 14 can be pulled off.

Due to the simple and stable construction, the device according to the present teaching can be operated at high speeds, for example about 4000 rpm. The process of stripping a cable 4 can thus be carried out very quickly, with only a few seconds being required for a stripping process. It is also not necessary to measure the severing of the protective sheath 14 with complex and error-prone devices, since severing the shielding layer is excluded in any case with the device according to the present teaching.

In many cables, a very thin (a few µm thick) boundary layer made of a soft plastics material is arranged between the protective sheath 14 and the shielding layer 13, which must be cut through and removed together with the protective sheath 14. In order to reliably sever through this thin boundary layer, the rolling wheel 8 can be designed to be heatable with a heating device. The rolling wheel 8 is heated sufficiently to melt the boundary layer as soon as the rolling wheel comes into the region of this layer. The heating of the rolling wheel can also accelerate the wearing down of the protective sheath 14. The boundary layer and/or a remaining part of the protective sheath 14 may additionally or alternatively be weakened or perforated by applying an electrical voltage to one of the elements of the work wheel arrangement by means of spark erosion.

In FIG. 3, the rolling wheel 8 and the cutting wheel 9 are shown spaced relatively far apart for reasons of clarity. In order to clamp the cable 4 securely between the work wheel arrangement 10 and the support rollers 3, 3', however, it is preferred to arrange the rolling wheel 8 and the cutting wheel 9 closer to one another, with the circumferential contours of the two wheels possibly also overlapping if the wheel profiles allow this. Wheel profiles of the rolling wheel 8 and cutting wheel 9, which allow overlapping, are shown in FIG. 2, for example. This arrangement uses the property of the rolling wheel 8, which deforms and wears down the material of the protective sheath 14 not only in direct contact, but also in a specific region laterally of this contact.

The present teaching is not limited only to embodiments in which the work wheel arrangement 10 consists of a rolling wheel 8 and a cutting wheel 9, but there are numerous alternative embodiments, a selection of which is described below by way of example with reference to FIGS. 4 to 7.

Figure 4:
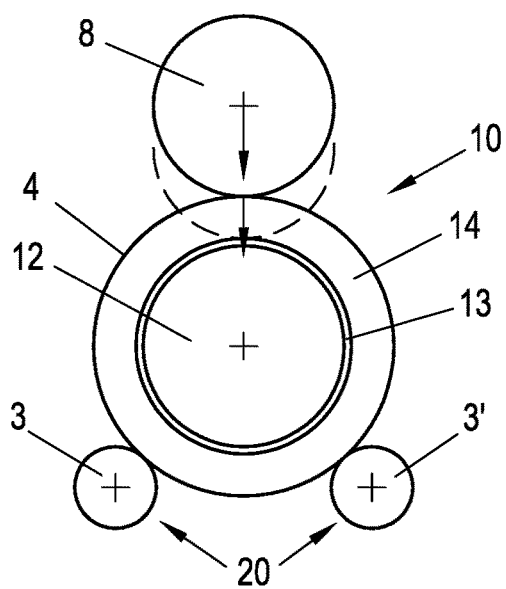
FIG. 4 is a schematic cross section of a cable and the work wheel arrangement, and the support roller arrangement engaging the cable according to another embodiment.
Figure 5:
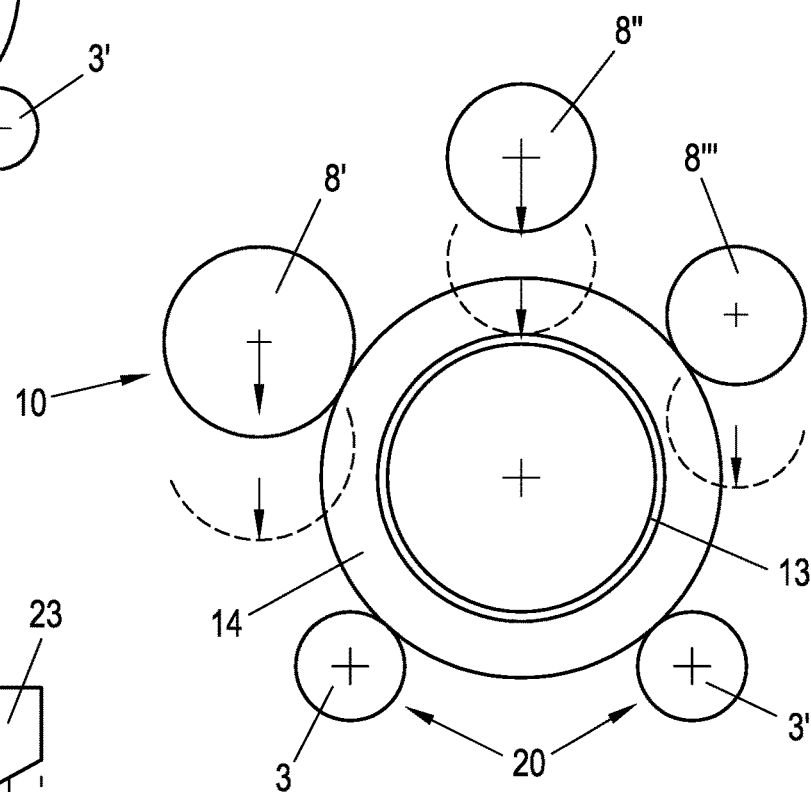
FIG. 5 is a schematic cross section of a cable and the work wheel arrangement, and the support roller arrangement engaging the cable according to another embodiment.
Figure 6:
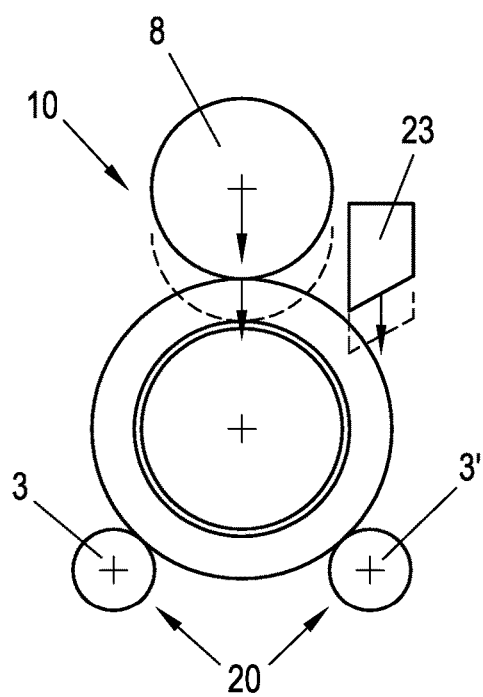
FIG. 6 is a schematic cross section of a cable and the work wheel arrangement, and the support roller arrangement engaging the cable according to another embodiment, and, FIG. 7 is a cross-sectional view of an alternative embodiment of a work wheel which is designed as a wobble wheel.

FIGS. 4 to 6 show in each case a cable 4 which is clamped between a support roller arrangement 20 (each with a pair of support rollers 3, 3') and a work wheel arrangement 10 in a manner analogous to that described above in connection with FIGS. 1 to 3.

In FIG. 4, the work wheel arrangement has a single rolling wheel 8, which rolls off on the protective sheath 14, pressing it and thereby fatiguing the casing material, until it can no longer offer sufficient resistance to penetration of the rolling wheel 8. The rolling wheel 8 penetrates further and further into the material of the protective sheath 14 until it has reached the shielding layer 13, which can no longer be penetrated by the rolling wheel 8, at least not within the time allotted for the stripping process. The rolling wheel 8 may also be heated in order to accelerate the wear-down process.

The roll-off speed of the rolling wheel 8 may also be braked or changed with a drive unit, so that, due to the relative speed between the rolling contour 18 and the surface of the protective sheath 14, friction develops which additionally wears down the material of the protective sheath 14 and, moreover, causes the heat-up of the rolling wheel 8 or the protective sheath 14. A similar effect can be achieved, for example, in that the axis of rotation of the rolling wheel 8 is not arranged parallel to the longitudinal axis of the cable 4, but is positioned slightly obliquely to it. As a result, friction between the rolling contour 18 of the rolling wheel 8 and the surface of the protective sheath 14 can be achieved without additional means. All of these alternative features can also be used in any desired manner with one another and optionally combined with the features described above and/or below, provided that this is technically possible.

FIG. 5 shows a further variant of a work wheel arrangement 10 which has three rolling wheels 8', 8", and 8'''. The rolling wheels 8', 8", and 8''' can have different or the same diameter and/or edge geometries and are arranged one behind the other in the roll-off direction (i.e. along the cutting region 15 running around the protective sheath 14 of the cable 4). When the work wheel arrangement 10 with the three rolling wheels 8', 8", and 8''' is moved together in the direction of the support roller arrangement 20 (as explained in connection with the description of FIGS. 1 to 3), the rolling wheels 8', 8", and 8''' penetrate the protective sheath 14 at a different speed; in relation to the direction of the axis of the cable 4. This can be used, for example, so that as the work wheel arrangement 10 approaches the support roller arrangement, different rolling wheels 8', 8" and 8''' have penetrated the farthest into the protective sheath 14. In relation to the radial direction (i.e. the direction from the point of contact between the respective rolling wheel 8 and the cable 4 to the center point of the cable 4), the individual rolling wheels 8', 8" and 8''' also have a different pressing force.

In FIG. 5, for example, an initial position is shown in which the outer rolling wheels 8' and 8''' are in contact with the protective sheath 14, while the middle rolling wheel 8" does not yet touch the edge of the protective sheath 14. At the end of the stripping process, however, it is the middle rolling wheel 8" which rests against the shielding layer 13, whereas the first rolling wheel 8' (shown on the left in FIG. 5) is furthest away from the shielding layer, and the third rolling wheel 8''' has also not yet reached the shielding layer 13. Through an expediently chosen combination of different individual features of the rolling wheels 8', 8" and 8''', extremely effective, fast, and safe stripping can be ensured, in particular for use with known and always the same cables 4. Any larger number of wheels may also be provided and the features of the wheels disclosed in this publication can be combined with one another in a meaningful manner. At least one of the rolling wheels 8', 8" and 8''' shown in FIG. 5 could also be replaced by a cutting wheel, provided that the cutting wheel does not come into contact with the shielding layer first.

The multiple rolling wheels 8', 8" and 8''' (regardless of their actual number) can optionally be arranged offset to one another in the running direction, whereby the material of the protective sheath 14 is pressed slightly back and forth as it rolls off.

FIG. 6 shows a further alternative embodiment of the work wheel arrangement 10. FIG. 6 shows that not only wheels can be used in the work wheel arrangement, but that it can also comprise other, non-rolling elements. In particular, FIG. 6 shows a rolling wheel 8 (similar to that shown in FIG. 4), which is combined with an "off-center" cutting blade 23. Due to the previously described effect of the different penetration speeds (in the direction of the cable axis) at the same feed speed, the cutting blade 23 can never come into contact with the shielding layer 13, even if it substantially comes into contact with the protective sheath at the same time or even before the rolling wheel 8. Nevertheless, the cutting blade 23 penetrates deeply enough into the material of the protective sheath 14 to effect a complete separation in interaction with the rolling wheel 8.

Figure 7:
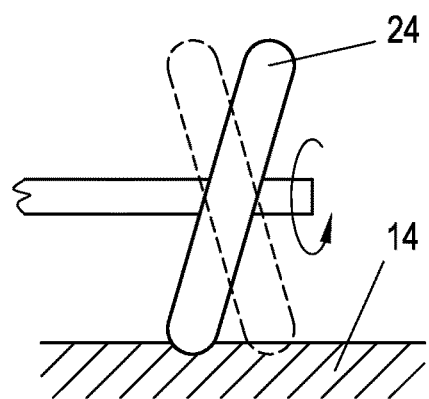

FIG. 7 shows an alternative feature of a wheel of the work wheel arrangement 10, which wheel is designed as a wobble wheel 24. The axis of rotation of the wobble wheel 24 is inclined to the wheel plane, so that the point of contact between the wobble wheel 24 and the surface of the protective sheath 14 moves back and forth with the revolution. The representation in FIG. 7 is not to scale and serves purely for illustration (this also applies to the other figures). In FIG. 7, the angle of the wobble wheel is chosen to be very large for the sake of clarity. In a real implementation, a much smaller angle can be sufficient to cause a wobbling motion that quickly and effectively weakens the sheath material.

In order to achieve a clean cutting edge, an electrical voltage can be applied to one of the elements of the work wheel arrangement (e.g., via a rolling wheel 8, a cutting wheel 9, a cutting blade 23 and/or another electrode), in order to weaken and/or perforate the already weakened and almost severed protective sheath 14 and/or a boundary layer arranged between the protective sheath 14 of the shielding layer 13 by means of spark erosion. The voltage is preferably adapted to the regulation of the device and occurs, for example, only when the work wheel arrangement 10 has come close enough to the shielding layer 13 and possibly in coordination with the revolution of the work wheel arrangement 10. The rolling wheel 8 and/or the cutting wheel 9 act as an electrode for the spark erosion. A separate electrode may also be provided on the work wheel arrangement for this purpose.

The invention claimed is:

1. A device for stripping a cable, the device comprising:
   a support roller arrangement;
   a work wheel arrangement, wherein the work wheel arrangement is displaceable relative to the support roller arrangement along a guide direction running transversely to and through an axis of rotation;
   wherein an end of the cable to be stripped can be clamped with an application of a pressure force between the work wheel arrangement and the support roller arrangement, wherein the pressure force is created by displacement of the work wheel arrangement relative to the support roller arrangement and acts along the guide direction;

wherein a unit made up of the work wheel arrangement and the support roller arrangement is driven to rotate and to unroll around the cable;

wherein the work wheel arrangement has a rolling wheel and a cutting wheel which roll off along a cutting region on the circumference of the cable;

wherein the rolling wheel has a blunter edge geometry than the cutting wheel; and wherein a radially outer edge of the rolling wheel is arranged closer to an axis of rotation than a radially outer edge of the cutting wheel.

2. The device according to claim 1, wherein the support roller arrangement is arranged on a rotation base, wherein the work wheel arrangement is arranged at a work wheel guide, and wherein the rotation base and the work wheel guide are connected to one another via at least one linear guide, wherein the linear guide is configured to allow displacement of the work wheel arrangement relative to the rotation base and the support roller arrangement along the guide direction.

3. The device according to claim 2, wherein a position of the linear guide is adjustable.

4. The device according to claim 2, wherein the work wheel guide has an eccentric weight distribution in relation to the axis of rotation, wherein a centrifugal force causing the pressure force acts on the work wheel guide, when the rotation base, with the work wheel guide arranged thereon via the at least one linear guide, rotates around the axis of rotation.

5. The device according to claim 1, wherein the work wheel arrangement has at least two rolling wheels which may have a different edge geometry.

6. The device according to claim 1, wherein at least an element of the work wheel arrangement is designed as a wobble wheel.

7. The device according to claim 1, wherein the rolling wheel has a larger radius than the cutting wheel.

8. The device according to claim 1, wherein the rolling wheel is heatable.

9. The device according to claim 1, wherein an electrical voltage is applied to at least one of the rolling wheel, the cutting wheel, and an electrode of the work wheel arrangement to induce spark erosion.

10. A method for stripping a cable comprising:
clamping an end of the cable to be stripped with an application of a pressure force between a work wheel arrangement and a support roller arrangement, wherein the work wheel arrangement comprises a rolling wheel and a cutting wheel, and wherein the pressure force is created by displacement of the work wheel arrangement relative to the support roller arrangement in a guide direction running transversely to and through an axis of rotation;
driving a unit made up of the work wheel arrangement and the support roller arrangement to rotate and unroll around the cable;

wherein the rolling wheel and the cutting wheel roll off along a cutting region on the circumference of the cable;

wherein the rolling wheel has a blunter edge geometry than the cutting wheel; and wherein the radially outer edge of the rolling wheel is arranged closer to an axis of rotation than the radially outer edge of the cutting wheel.

11. The method according to claim 10, wherein the support roller arrangement is arranged on a rotation base, wherein the work wheel arrangement is arranged on a work wheel guide, and wherein the rotation base and the work wheel guide are connected to one another via at least one linear guide, wherein the linear guide is configured to allow displacement of the work wheel arrangement relative to the rotation base and the support roller arrangement along a guide direction running transversely to the axis of rotation.

12. The method according to claim 11, wherein the work wheel guide has an eccentric weight distribution in relation to the axis of rotation, wherein a centrifugal force causing the pressure force acts on the work wheel guide, when the rotation base, with the work wheel guide arranged thereon via the at least one linear guide, rotates around the axis of rotation.

13. The method according to claim 11, wherein the rotation base is driven at a maximum speed between 3000 rpm and 5000 rpm.

14. The method according to claim 11, wherein the work wheel guide has an eccentric) The device according to claim 1, wherein the support roller arrangement comprises a plurality of support rollers.

15. The method according to claim 10, wherein the rolling wheel of the work wheel arrangement rolls off along a cutting region on the circumference of the cable.

16. The method according to claim 10, wherein the work wheel arrangement further comprises at least a second rolling wheel, which may have a different edge geometry, and wherein the second rolling wheel rolls off along a cutting region on the circumference of the cable.

17. The method according to claim 10, wherein at least one element of the work wheel arrangement rolls off along a cutting region on the circumference of the cable in a wobbling manner.

18. The method according to claim 10, wherein the rolling wheel is used which has a larger radius than the cutting wheel.

19. The method according to claim 10, wherein the rolling wheel is heated.

20. The method according to claim 10, wherein an electrical voltage is applied to at least one of the rolling wheel, the cutting wheel, and an electrode of the work wheel arrangement to induce spark erosion.

21. The method according to claim 10, wherein the support roller arrangement comprises a plurality of support rollers.

* * * * *